(12) United States Patent
Yokouchi

(10) Patent No.: US 7,519,355 B2
(45) Date of Patent: Apr. 14, 2009

(54) METHOD AND APPARATUS FOR SENDING E-MAIL, METHOD AND APPARATUS FOR RECEIVING E-MAIL, AND PROGRAMS THEREFOR

(75) Inventor: Kouji Yokouchi, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 135 days.

(21) Appl. No.: 10/669,595

(22) Filed: Sep. 25, 2003

(65) Prior Publication Data
US 2004/0063447 A1    Apr. 1, 2004

(30) Foreign Application Priority Data
Sep. 26, 2002    (JP)    ............... 2002-281509

(51) Int. Cl.
*H04M 1/663*    (2006.01)
(52) U.S. Cl. ............... 455/412.2; 455/412.1; 455/413; 455/414.1; 455/414.2
(58) Field of Classification Search ... 455/412.1–412.2, 455/414.1, 466, 404.2, 456.1, 456.3, 421, 455/414.2, 414.3, 456.2; 709/206
See application file for complete search history.

(56) References Cited

U.S. PATENT DOCUMENTS

| | | | |
|---|---|---|---|
| 7,071,842 B1 * | 7/2006 | Brady, Jr. ............... | 340/988 |
| 2002/0059178 A1 * | 5/2002 | Hirabayashi et al. ............ | 707/1 |
| 2002/0102993 A1 * | 8/2002 | Hendrey et al. ............. | 455/456 |
| 2003/0004776 A1 * | 1/2003 | Perella et al. ............... | 705/9 |
| 2003/0154126 A1 * | 8/2003 | Gehlot et al. ................. | 705/14 |
| 2003/0158904 A1 * | 8/2003 | Suzuki et al. ............... | 709/206 |
| 2004/0054732 A1 * | 3/2004 | Carter et al. ................ | 709/206 |
| 2004/0137886 A1 * | 7/2004 | Ross et al. ............... | 455/414.1 |
| 2007/0117541 A1 * | 5/2007 | Helferich ................. | 455/412.1 |

FOREIGN PATENT DOCUMENTS

| | | |
|---|---|---|
| JP | 58-47341 A | 3/1983 |
| JP | 2001-250183 A | 9/2000 |
| JP | 2001-53861 A | 2/2001 |

* cited by examiner

*Primary Examiner*—Duc Nguyen
*Assistant Examiner*—Dai Phuong
(74) *Attorney, Agent, or Firm*—Birch, Stewart, Kolasch & Birch, LLP

(57) ABSTRACT

A recipient can receive an E-mail message at a reception location specified by a sender. Reception location information specifying the reception location is sent from a sender mobile phone together with the E-mail message. A mail server stores the E-mail message and monitors a position of a recipient mobile phone. The mail server judges whether or not the recipient mobile phone has been moved to the reception location specified in the reception location information, and sends the E-mail message to the recipient mobile phone in the case where a result of the judgment becomes affirmative.

6 Claims, 4 Drawing Sheets

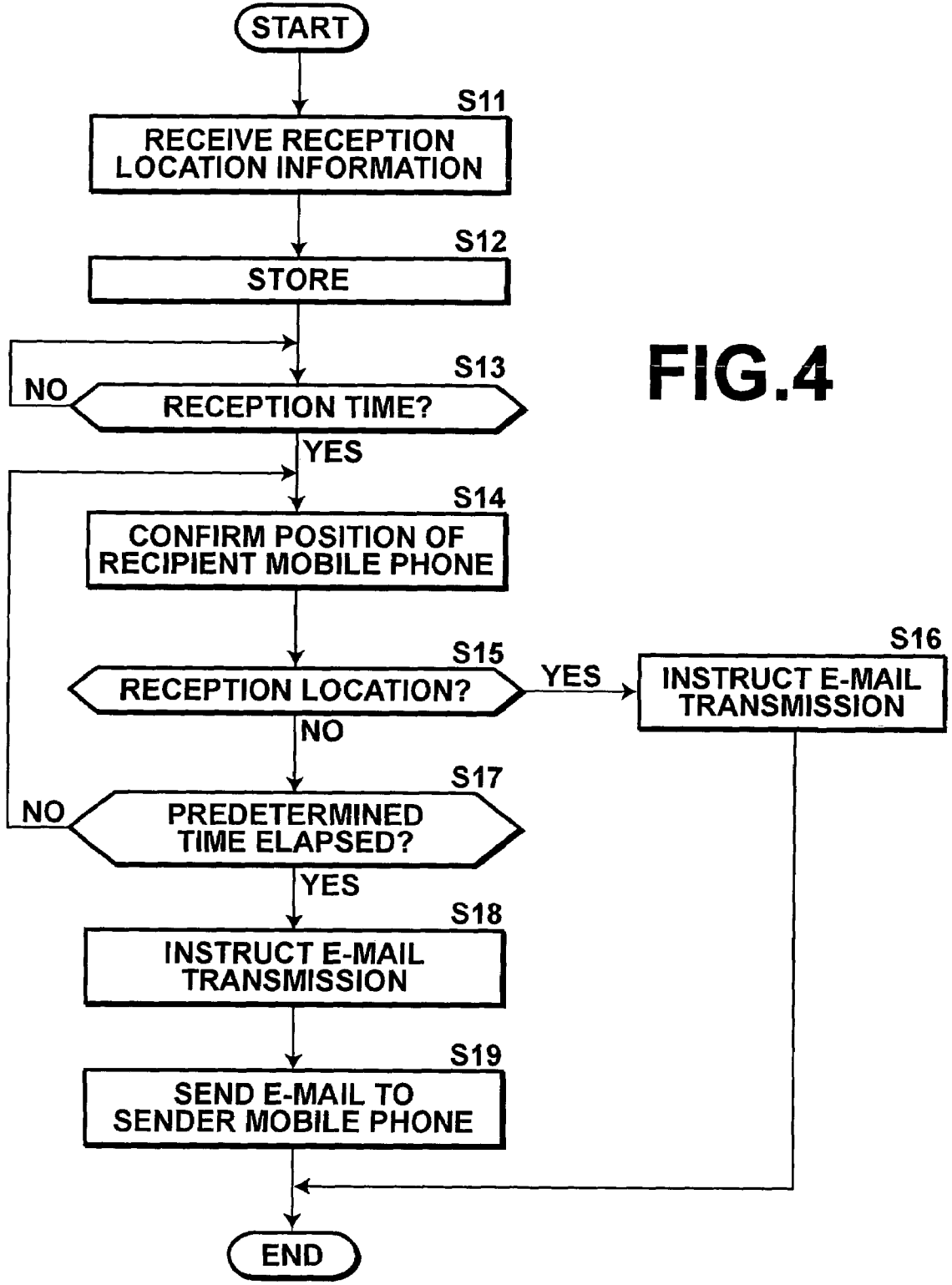

METHOD AND APPARATUS FOR SENDING E-MAIL, METHOD AND APPARATUS FOR RECEIVING E-MAIL, AND PROGRAMS THEREFOR

This Nonprovisional application claims priority under 35 U.S.C. § 119(a) on patent application No(s) . 2002-281509 filed in Japan on Sep. 26, 2002, the entire contents of which are hereby incorporated by reference.

BACKGROUND OF THE INVENTION

1. Field of the Invention

The present invention relates to a method and an apparatus for sending an E-mail message to a mobile terminal, to a method and an apparatus for receiving the E-mail message, and to programs that cause a computer to execute the E-mail sending method and the E-mail reception method.

2. Description of the Related Art

The spread of mobile phones is remarkable, and mobile phones enable not only communication by voice but also E-mail transmission and reception. Therefore, E-mails are available to a large number of people. An E-mail message is exchanged via a mobile phone in the following manner. First, a sender sends an E-mail message to a recipient. The E-mail message is stored in a mailbox that has the E-mail address of the recipient and is installed in a mail server of a mobile phone service provider. The recipient is notified of storage of the E-mail message, and accesses the mailbox via a mobile phone communication network. In this manner, the E-mail message stored in the mailbox is downloaded to a mobile phone of the recipient, and the recipient can receive the E-mail message.

When the E-mail message is sent from the sender, the recipient is usually notified of the fact immediately after the transmission. However, the sender may wish the recipient to receive the E-mail message only in the case where the recipient is in a specific place. For example, in the case where a sender is to meet his/her friend, the sender wishes the friend to receive an E-mail message only in the case where the friend is at the rendezvous point.

SUMMARY OF THE INVENTION

The present invention has been conceived based on consideration of the above circumstances. An object of the present invention is therefore to enable a recipient to receive an E-mail message at a place specified by a sender of the massage.

An E-mail sending method of the present invention is a method of sending an E-mail message from a sender terminal to a recipient mobile terminal as a destination of the E-mail message, and the method comprises the steps of:

storing the E-mail message sent with a reception location being specified by the sender terminal;

making a judgment as to whether or not the recipient mobile terminal is at the reception location; and sending the E-mail message to the recipient mobile terminal in the case where a result of the judgment is affirmative.

The sender terminal may be a mobile phone or a PDA. Alternatively, the sender terminal may be a stationary terminal such as a personal computer.

The recipient mobile terminal refers to a mobile terminal such as a mobile phone or a PDA that is portable.

In a mobile phone communication network, base stations are located in many places, and the base stations are connected to a server run by a mobile phone service provider. A mobile phone is always notifying a position thereof to the base stations, and the server is always monitoring where the mobile phone is. In this manner, the server can understand which mobile phone is located in a coverage area of which of the base stations (see Japanese Patent Publication No. 2(1990)-6461, for example). Therefore, by using position information of the recipient mobile terminal registered with a server of a mobile phone service provider, whether or not the recipient mobile terminal is at the reception location can be judged.

In the case where the recipient mobile terminal receives positioning radio signals from GPS satellites and sends the radio signals as GPS information to the server, whether or not the recipient mobile terminal is at the reception location may be judged based on the GPS information.

In the E-mail sending method of the present invention, the step of judging whether or not the recipient mobile terminal is at the reception location may further comprise the steps of:

inferring a direction of the recipient mobile terminal, based on a ratio of input field intensities sent from the recipient mobile terminal to base stations of a mobile phone communication network;

inferring a distance from each of the base stations to the recipient mobile terminal, based on the input field intensity; and finding where the recipient mobile terminal is, based on the inferred direction and the inferred distance (see Japanese Unexamined Patent Publication No. 2001-53861, for example).

Furthermore, the step of judging whether or not the recipient mobile terminal is at the reception location may further comprise the steps of:

causing the base stations of the mobile phone communication network to respectively send position detection signals by an instruction from the recipient mobile terminal; and finding where the recipient mobile terminal is, based on times necessary for the position detection signals to return from the recipient mobile terminal (see Japanese Unexamined Patent Publication No. 2001-250183, for example).

In the E-mail sending method of the present invention, in the case where the E-mail message sent from the sender terminal designates reception time, a judgment is made as to whether or not the reception time has come, in addition to the judgment as to whether or not the recipient mobile terminal is at the reception location. The E-mail message is then sent to the recipient mobile terminal in the case where a result of the judgment about the reception time becomes affirmative and the result of the judgment about the position of the recipient mobile terminal is also affirmative.

In this case, if the result of the judgment as to whether or not the recipient mobile terminal is at the reception location is negative after a predetermined time has elapsed since starting of the judgment as to whether or not the reception time has come, the E-mail message may be sent to the recipient mobile terminal.

In the E-mail sending method of the present invention, the E-mail message may be sent to the recipient mobile terminal in the case where the result of the judgment as to whether or not the recipient mobile terminal is at the reception location is negative after a predetermined time has elapsed since the sender terminal sent the E-mail message.

In the E-mail sending method of the present invention, an E-mail message notifying the fact that the E-mail message has been sent may be sent to the sender terminal.

An E-mail reception method of the present invention is a method of receiving an E-mail message sent from a sender terminal and stored in a mail server, by using a recipient mobile terminal as a destination of the E-mail message. The method comprises the steps of:

making a judgment as to whether or not the recipient mobile terminal is in a reception location in the case where the E-mail message was sent in a case where the reception location was specified by the sender terminal; and instructing the mail server to cause the recipient mobile terminal to receive the E-mail message, in the case where a result of the judgment is affirmative.

In the E-mail reception method of the present invention, in the case where the E-mail message sent from the sender terminal designates a reception time, a judgment may be made as to whether or not the reception time has come, in addition to the judgment as to whether or not the recipient mobile terminal is at the reception location. In this case, the mail server is then instructed to cause the recipient mobile terminal to receive the E-mail message in the case where a result of the judgment about the reception time becomes affirmative and the result of the judgment about the position of the recipient mobile terminal is also affirmative.

In this case, if the result of the judgment as to whether or not the recipient mobile terminal is at the reception location is negative after a predetermined time has elapsed since starting of the judgment as to whether or not the reception time has come, the server may be instructed to cause the recipient mobile terminal to receive the E-mail message.

In the E-mail reception method of the present invention, the server may be instructed to cause the recipient mobile terminal to receive the E-mail message, in the case where the result of the judgment as to whether or not the recipient mobile terminal is at the reception location is negative after a predetermined time has elapsed since the sender terminal sent the E-mail message.

An E-mail sending apparatus of the present invention is an apparatus for sending an E-mail message sent from a sender terminal to a recipient mobile terminal as a destination of the E-mail message, and the apparatus comprises:

mail storage means for storing the E-mail message sent with a reception location being specified by the sender terminal;

position judgment means for making a judgment as to whether or not the recipient mobile terminal is at the reception location; and transmission control means for sending the E-mail message to the recipient mobile terminal only in the case where a result of the judgment is affirmative.

In the E-mail sending apparatus of the present invention, in the case where the E-mail message sent from the sender terminal designates a reception time, the judgment means may make a judgment as to whether or not the reception time has come, in addition to the judgment as to whether or not the recipient mobile terminal is at the reception location; so that the transmission control means can send the E-mail message to the recipient mobile terminal in the case where a result of the judgment about the reception time becomes affirmative and the result of the judgment about the position of the recipient mobile terminal is also affirmative.

In this case, if the result of the judgment as to whether or not the recipient mobile terminal is at the reception location is negative after a predetermined time has elapsed since starting of the judgment as to whether or not the reception time has come, the transmission control means may send the E-mail message to the recipient mobile terminal.

In the E-mail sending apparatus of the present invention, the transmission control means may send the E-mail message to the recipient mobile terminal in the case where the result of the judgment as to whether or not the recipient mobile terminal is at the reception location is negative after a predetermined time has elapsed since the sender terminal sent the E-mail message.

In the E-mail sending apparatus of the present invention, the transmission control means may send an E-mail message to notify the sender terminal that the E-mail message has been sent.

An E-mail reception apparatus of the present invention is an apparatus for receiving an E-mail message sent from a sender terminal and stored in a mail server, by using a recipient mobile terminal as a destination of the E-mail message. The E-mail reception apparatus comprises:

position judgment means for making a judgment as to whether or not the recipient mobile terminal is in a reception location in the case where the E-mail message was sent in a state where the reception location was specified by the sender terminal; and transmission control means for instructing the mail server to cause the recipient mobile terminal to receive the E-mail message in the case where a result of the judgment is affirmative.

In the case where the E-mail message sent from the sender terminal designates a reception time, the position judgment means of the E-mail reception apparatus of the present invention may make a judgment as to whether or not the reception time has come, in addition to the judgment as to whether or not the recipient mobile terminal is at the reception location; so that the transmission control means can instruct the mail server to cause the recipient mobile terminal to receive the E-mail message in the case where a result of the judgment about the reception time is affirmative and the result of the judgment about the position of the recipient mobile terminal is also affirmative.

In the E-mail reception apparatus of the present invention, if the result of the judgment as to whether or not the recipient mobile terminal is at the reception location is negative after a predetermined time has elapsed since starting of the judgment as to whether or not the reception time has come, the position judgment means may instruct the mail server to cause the recipient mobile terminal to receive the E-mail message.

In the E-mail reception apparatus of the present invention, the position judgment means may instruct the mail server to cause the recipient mobile terminal to receive the E-mail message in the case where the result of the judgment as to whether or not the recipient mobile terminal is at the reception location is negative after a predetermined time has elapsed since the sender terminal sent the E-mail message.

The E-mail sending method and the E-mail reception method of the present invention may be provided as programs to cause a computer to execute the methods.

According to the E-mail sending method and the E-mail sending apparatus of the present invention, the sender terminal sends the E-mail message specifying the reception location for the recipient mobile terminal, and the E-mail message is stored. Whether or not the recipient mobile terminal is at the reception location is judged, and the E-mail message is sent to the recipient mobile terminal if the result of the judgment is affirmative. In this manner, the E-mail message is sent only in the case where the recipient mobile terminal is at the reception location designated by the sender terminal. Therefore, a recipient can receive the E-mail message by using the recipient mobile terminal in the reception location specified by a sender with use of the sender terminal.

If the E-mail message that designates the reception time as well as the reception location is sent from the sender terminal and stored, whether or not the recipient mobile terminal is at the reception location and whether or not the reception time has come are judged. The E-mail message is sent to the recipient mobile terminal in the case where the result of the judgment as to whether or not the recipient mobile terminal is at the reception location is affirmative and the result of the judgment as to whether or not the reception time has come also becomes affirmative. In this manner, the E-mail message is sent only in the case where the recipient mobile terminal is at the reception location and the reception time has come. Therefore, the recipient can receive the E-mail message by using the recipient mobile terminal at the reception location and at the reception time specified by the sender with use of the sender terminal.

If the E-mail message is sent to the recipient mobile terminal in the case where the result of the judgment as to whether or not the recipient mobile terminal is at the reception location is negative after the predetermined time has elapsed since the start of the judgment as to whether or not the reception time has come or since the sender terminal sent the E-mail message, a problem that the E-mail message is not sent can be avoided even if the recipient mobile terminal is outside the reception location.

In this case, if the E-mail message is sent to notify the sender terminal that the E-mail message has been sent, the sender can understand the fact that the E-mail message sent from the sender terminal has sent to the reception mobile terminal because the recipient mobile terminal was not moved to the reception location.

According to the E-mail reception method and the E-mail reception apparatus of the present invention, the sender terminal sends the E-mail message that designates the reception location for the recipient mobile terminal, and the E-mail message is stored. Whether or not the recipient mobile terminal is at the reception location is judged, and the instruction is sent to cause to the recipient mobile terminal to receive the E-mail message if the result of the judgment is affirmative. In this manner, the E-mail message is received by the recipient mobile terminal only in the case where the recipient mobile terminal is moved to the reception location specified by the sender terminal, and a recipient can receive the E-mail message by using the recipient mobile terminal at the reception location specified by a sender with use of the sender terminal.

Furthermore, if the E-mail message specifying the reception time as well as the reception location for the recipient mobile terminal is sent from the sender terminal and stored, the instruction is sent to cause the recipient mobile terminal to receive the E-mail message in the case where the result of the judgment as to whether or not the recipient mobile terminal is at the reception location is affirmative and the result of the judgment as to whether or not the reception time has come also becomes affirmative. In this manner, the E-mail message is received only in the case where the recipient mobile terminal is at the reception location specified by the sender terminal and the reception time has come. Therefore, the recipient can receive the E-mail message by using the recipient mobile terminal at the reception location and at the reception time specified by the sender with use of the sender terminal.

If the instruction is sent to cause the recipient mobile terminal to receive the E-mail message in the case where the result of the judgment as to whether or not the recipient mobile terminal is at the reception location is negative after the predetermined time has elapsed since the start of the judgment as to whether or not the reception time has come or since the sender terminal sent the E-mail message, a problem that the E-mail message is not sent can be avoided even if the recipient terminal was not moved to the reception location.

BRIEF DESCRIPTION OF THE DRAWINGS

FIG. 4 is a flow chart showing procedures carried out in the second embodiment.

DESCRIPTION OF THE PREFERRED EMBODIMENTS

Figure 1:
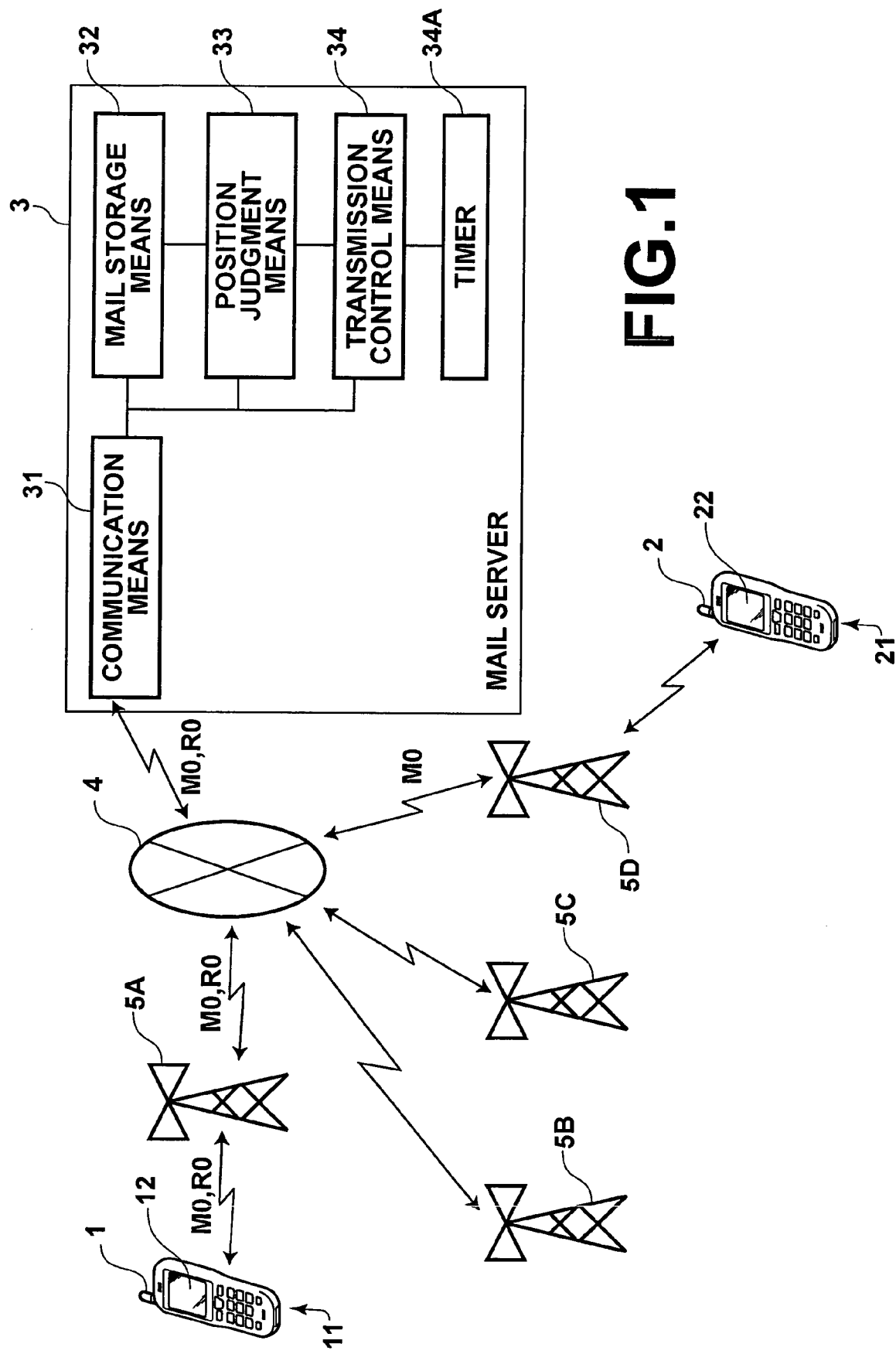
FIG. 1 is a block diagram showing the configuration of an E-mail sending system according to a first embodiment of the present invention.

Hereinafter, embodiments of the present invention will be explained with reference to the accompanying drawings. FIG. 1 is a block diagram showing a configuration of an E-mail sending system of a first embodiment of the present invention. As shown in FIG. 1, the E-mail sending system in the first embodiment sends an E-mail message M0 from a sender mobile phone 1 to a recipient mobile phone 2 via a mobile phone communication network 4 after temporarily storing the E-mail message M0 in a mail server 3.

The sender mobile phone 1 comprises operation buttons 11 such as ten keys, and a liquid crystal display monitor 12. The mobile phone 1 enables E-mail transmission and reception through an operation of the buttons 11 by a sender as an owner of the sender mobile phone 1. When the E-mail message M0 is sent from the sender mobile phone 1, reception location information R0 is also sent for specifying a reception location and a reception time regarding the E-mail message M0.

The reception location is specified with use of an electronic map stored in advance in the sender mobile phone 1. The electronic map is displayed on the liquid crystal display monitor 12 so that the sender can specify the reception location in the map by using the operation buttons 11. After transmission of the E-mail message M0, it is preferable for the map near the reception location to be displayed as a default in the case where a new reception location is specified for another E-mail message.

The recipient mobile phone 2 comprises operation buttons 21 such as ten keys, and a liquid crystal display monitor 22. The recipient mobile phone 2 enables E-mail transmission and reception through an operation of the buttons 22 by a recipient as an owner of the recipient mobile phone 2.

The mail server 3 is run by a mobile phone service provider, and carries out communication with the mobile phones 1 and 2 via base stations 5A~5D in the mobile phone communication network 4. For this purpose, the mail server 3 comprises communication means 31, mail storage means 32, position judgment means 33, and transmission control means 34. The communication means 31 carries out E-mail transmission and reception. The mail storage means 32 has a mailbox for temporarily storing the E-mail message M0 for the recipient. The position judgment means 33 judges whether or not the recipient mobile phone 2 is at the reception location specified by the reception location information R0. The transmission control means 34 controls E-mail transmission, based on a position of the recipient mobile phone 2.

The base stations 5A~5D each exist in their respective locations. The mobile phones 1 and 2 are always notifying positions thereof to the closest base stations 5A~5D. In this manner, information representing the closest base stations regarding the mobile phones is input as the positions of the mobile phones 1 and 2 to the position judgment means 33 of the mail server 3. Therefore, the position judgment means 33 can recognize which of the mobile phones is in a coverage area of which of the base stations, based on the information of the closest base stations input thereto. More specifically, the mobile phones 1 and 2 are always sending information for specifying the positions thereof (hereinafter referred to as position information P0), and the closest base stations 5A~5D receive the position information P0 for notifying the reception to the mail server 3. The position judgment means 33 then recognizes which of the mobile phones is in the coverage area of which of the base stations.

For example, if the position information P0 sent from the sender mobile phone 1 is received by the base station 5A, the position judgment means 33 judges that the sender mobile phone 1 is in the coverage area of the base station 5A. If the position information P0 sent from the recipient mobile phone 2 is received by the base station 5D, the position judgment means 33 recognizes that the recipient mobile phone 2 is in the coverage area of the base station 5D.

The position judgment means 33 confirms where the recipient mobile phone 2 is, at the reception time specified by the reception location information R0. The position judgment means 33 judges whether or not the recipient mobile phone 2 is at the reception location, and sends a result of the judgment to the transmission control means 34.

The transmission control means 34 controls the communication means 31 so as to send the E-mail message M0 to the recipient mobile phone 2, according to the result of the judgment by the position judgment means 33.

In the case where the recipient mobile phone 2 was not moved to the coverage area of the base station specified by the reception location information R0 after a predetermined time had passed since the reception time, the E-mail message would not be sent to the recipient mobile phone 2 for a long time. In order to prevent this problem, the transmission control means 34 sends the E-mail message M0 to the recipient mobile phone 2 regardless of the position of the recipient mobile phone 2, in the case where the predetermined time has passed since the reception time specified by the reception location information R0. A timer 34A installed in the transmission control means 34 carries out this time management. In this case, an E-mail message M1, representing the fact that the E-mail message M0 was sent to the recipient mobile phone 2 because the recipient mobile phone 2 was not moved to the reception location specified by the reception location information R0, is sent to the sender mobile phone 1.

Figure 2:
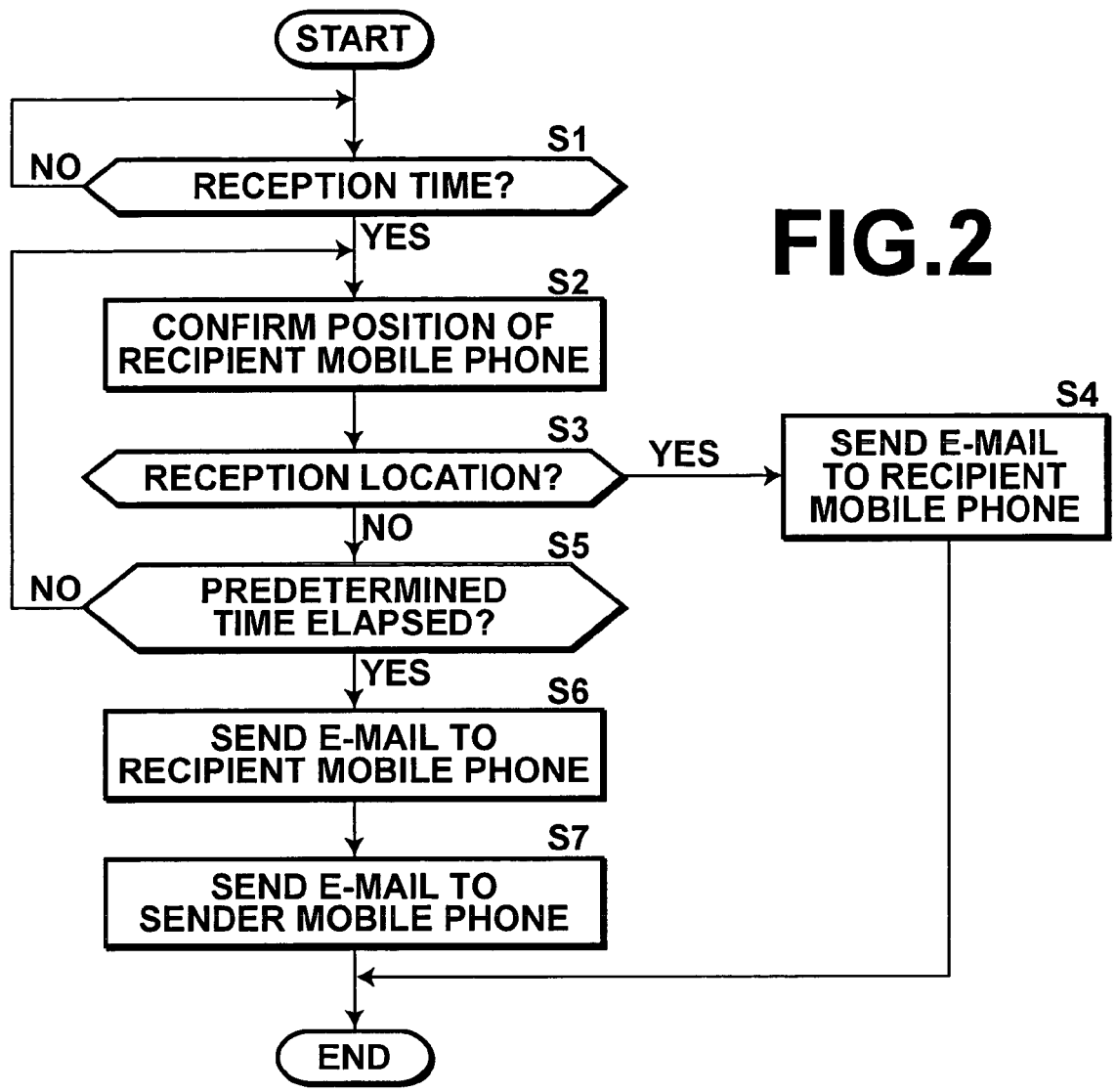
FIG. 2 is a flow chart showing procedures carried out in the first embodiment.

The operation of the first embodiment will be explained next. FIG. 2 is a flow chart showing procedures carried out in the first embodiment. In this example, the mail server 3 is assumed to store the E-mail message M0 sent from the sender mobile phone 1 to the recipient mobile phone 2 and the reception location information R0 specifying the reception location and the reception time. The recipient mobile phone 2 is always sending the position information P0 to the base stations 5A~5D for representing the position thereof, and the position judgment means 33 registers the coverage area of one of the base stations 5A~5D in which the recipient mobile phone 2 is. The position is updated according to movement of the recipient mobile phone 2.

The transmission control means 34 is always monitoring whether the reception time specified in the reception location information R0 has come (Step S1). If a result at Step S1 is affirmative, the position judgment means 33 confirms the position of the recipient mobile phone 2 (Step S2). Whether or not the recipient mobile phone 2 is at the reception location specified by the reception location information R0 is then judged (Step S3).

If a result at Step S3 is affirmative, the transmission control means 34 controls the communication means 31 so that the E-mail message M0 stored in the mail storage means 32 is sent to the recipient mobile phone 2 (Step S4) to end the process.

If the result at Step S3 is negative, whether or not the predetermined time has elapsed since the reception time specified in the reception location R0 is then judged (Step S5). If a result at Step S5 is negative, the process returns to Step S2 and the procedures from Step S2 to Step S5 are repeated. If the result at Step S5 is affirmative, the E-mail message M0 stored in the mail storage means 32 is sent to the recipient mobile phone 2, regardless of where the recipient mobile phone 2 is (Step S6). Furthermore, the E-mail message M1, indicating the transmission of the E-mail message M0, is sent to the sender mobile phone 1 (Step S7) and the process ends.

As has been describe above, according to the first embodiment, the E-mail message M0 is sent to the recipient mobile phone 2 only in the case where the recipient mobile phone 2 is at the reception location specified by the sender mobile phone 1. Therefore, the recipient using the recipient mobile phone 2 can receive the E-mail message M0 at the reception location specified by the sender using the sender mobile phone 1.

Since the E-mail message M0 is sent to the recipient mobile phone 2 only in the case where the reception time specified by the reception location information R0 has come, the recipient can receive the E-mail message M0 in the reception location and at the reception time specified by the sender.

In the case where the recipient mobile phone 2 was not moved to the reception location specified by the reception location information R0 after the predetermined time had elapsed since the reception time, the E-mail message M0 is sent to the recipient mobile phone 2. Therefore, even in the case where the recipient mobile phone 2 was not moved to the reception location, a problem that the E-mail message M0 is not sent can be avoided.

In this case, the E-mail message M1, indicating transmission of the E-mail message M0, is sent to the sender mobile phone 1. Therefore, the sender can understand the fact that the E-mail message M0 was sent to the recipient mobile phone 2 because the recipient mobile phone 2 was not moved to the reception location.

In the first embodiment described above, the E-mail message M0 is sent to the recipient mobile phone 2 in the case where the recipient mobile phone 2 is moved to the coverage area of the specified base station. However, since the coverage area of each of the base stations 5A~5D is comparatively large, the actual position of the recipient mobile phone 2 may be different from the reception location specified in the reception location information R0. Therefore, a direction of the recipient mobile phone 2 may be inferred, based on a ratio of input field intensities sent from the recipient mobile phone 2 to the base stations. In this case, a distance from each of the base stations 5A~5D to the recipient mobile phone 2 is also inferred, based on the input field intensity. Based on the direction and the distance that have been inferred, the accurate position of the recipient mobile phone 2 can be found (see Japanese Unexamined Patent Publication No. 2001-53861, for example).

Furthermore, position detection signals may be sent from the respective base stations 5A~5D by an instruction from the recipient mobile phone 2 so that the position of the recipient mobile phone 2 can be found based on times necessary for the position detection signals to return to the corresponding base stations 5A–5D (see Japanese Unexamined Patent Publication No. 2001-250183, for example).

Moreover, in the case where the recipient mobile phone 2 has GPS means for receiving positioning radio signals from GPS satellites and has a function of sending GPS information obtained by the GPS means as the position information P0 to the mail server 3, the position of the recipient mobile phone 2 may be found based on the position information P0 sent from the recipient mobile phone 2.

Instruction of the position detection signal transmission from the recipient mobile phone 2 and transmission of the position information P0 from the GPS means may be carried out at predetermined intervals. Alternatively, the position detection signal transmission instruction and the position information P0 may be sent in response to an instruction from the mail server 3. In this manner, power consumption by the recipient mobile phone 2 can be reduced.

In the first embodiment described above, the E-mail message M1 to notify the sender mobile phone 1 that the recipient mobile phone 2 was not in the reception location after the predetermined time had elapsed since the reception time specified by the reception location information R0 is sent. However, the E-mail message M1 may be sent to the sender mobile phone 1 in the case where the recipient mobile phone 2 was not in the reception location after a predetermined time had elapsed since transmission of the E-mail message M0 by the sender mobile phone 1.

Figure 3:
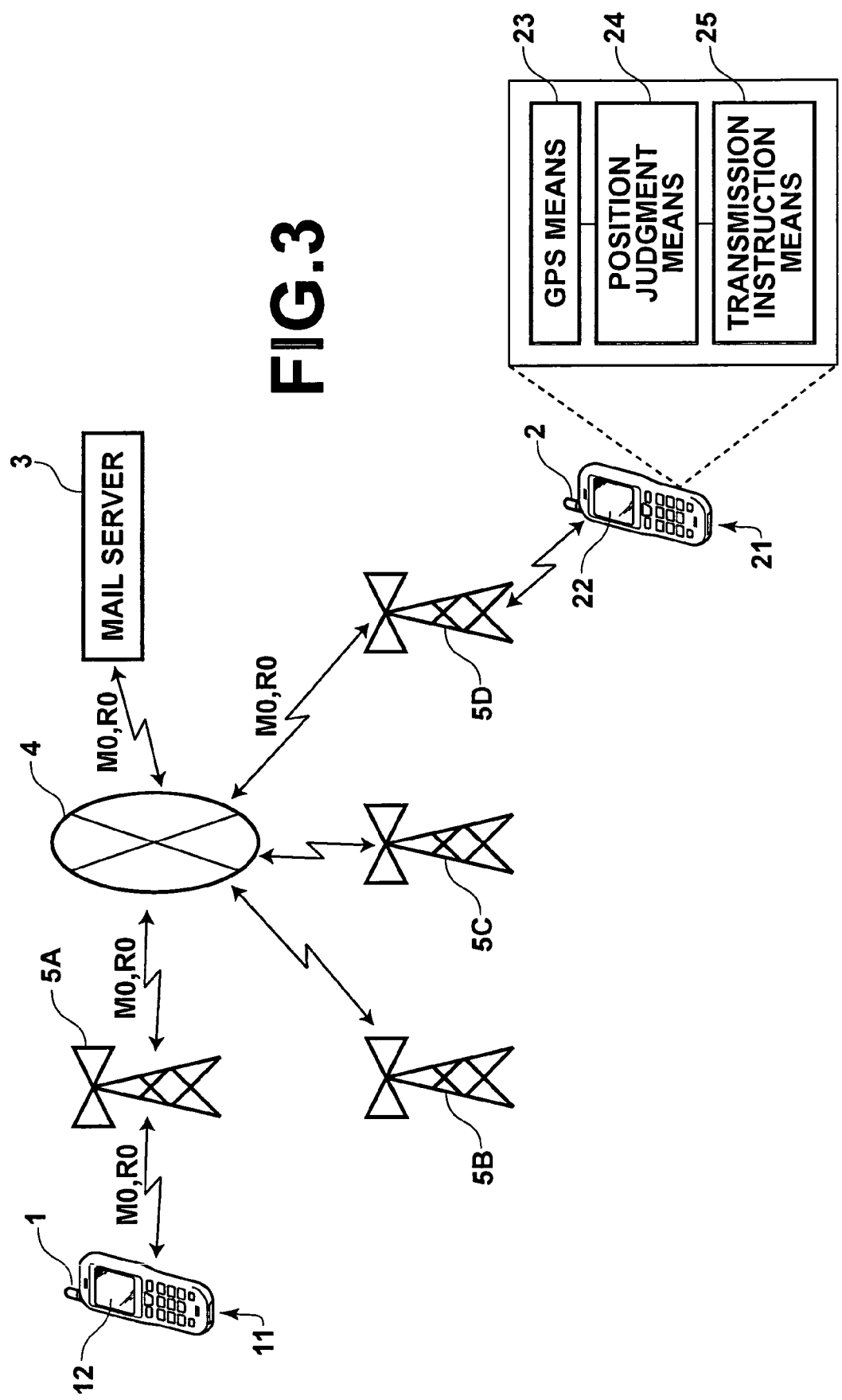
FIG. 3 is a block diagram showing the configuration of an E-mail sending system according to a second embodiment of the present invention.

A second embodiment of the present invention will be explained next. FIG. 3 is a block diagram showing a configuration of an E-mail sending system of the second embodiment of the present invention. In the second embodiment, the same elements as in the first embodiment have the same reference numbers, and detailed explanations thereof will be omitted. In the second embodiment, the mail server 3 sends the reception location information R0 to the recipient mobile phone 2. The recipient mobile phone 2 itself judges whether or not the recipient mobile phone 2 is at the reception location specified by the reception location information R0, and sends an instruction to the mail server 3 for transmission of the E-mail message M0 in the case where the recipient mobile phone 2 is at the reception location. Therefore, as shown in FIG. 3, the recipient mobile phone 2 has GPS means 23, position judgment means 24, and transmission instruction means 25. The GPS means 23 obtains the position information P0 representing where the recipient mobile phone 2 is, based on positioning radio signals sent from GPS satellites. The position judgment means 24 judges whether or not the recipient mobile phone 2 is at the reception location specified by the reception location information R0, based on the position information P0 and the reception location information R0. The transmission instruction means 25 instructs the mail server 3 to transfer the E-mail message M0 to the recipient mobile phone 2 in the case where the position of the recipient mobile phone 2 represented by the position information P0 agrees with the reception location specified by the reception location information R0.

Since complete agreement between the position information P0 and the reception location specified by the reception location information R0 is difficult, the judgment as to the agreement between the position information P0 and the reception location specified by the reception location information R0 may be made by assuming that the reception location refers to the reception location and its surrounding area of about 100 m radius.

The operation of the second embodiment will be explained next. FIG. 4 is a flow chart showing procedures carried out in the second embodiment. The mail server is assumed to have stored the E-mail message M0 sent from the sender mobile phone 1 to the recipient mobile phone 2 and the reception location information R0 representing the reception location and the reception time. Furthermore, the GPS means 23 is always obtaining the position information P0.

The recipient mobile phone 2 receives the reception location information R0 sent from the mail server 3 (Step S11). The reception location information R0 is stored in the position judgment means 24 (Step S12). The position judgment means 24 starts monitoring of whether the reception time specified in the reception location information R0 has come (Step S13). If a result at Step S13 becomes affirmative, the position information P0 is referred to for confirmation of the position of the recipient mobile phone 2 (Step S14). Whether or not the position of the recipient mobile phone 2 is the reception location specified by the reception location information R0 is then judged (Step S15).

If a result at Step S15 is affirmative, the transmission instruction means 25 sends the transmission instruction to the mail server 3, regarding the E-mail message M0 (Step S16). In this manner, the mail server 3 sends the E-mail message M0 to the recipient mobile phone 2, and the recipient mobile phone 2 can receive the E-mail message M0.

If the result at Step S15 is negative, whether the predetermined time has elapsed since the reception time specified in the reception location information R0 is judged (Step S17). If a result at Step S17 is negative, the process returns to Step S14, and the procedures from Step S14 to Step S17 are repeated. If the result at Step S17 is affirmative, the transmission instruction means 25 sends the transmission instruction regarding the E-mail message M0 to the mail server 3 regardless of the position of the recipient mobile phone 2 (Step S18), and the E-mail message M1 notifying the sender mobile phone 1 of transmission is sent (Step S19) to end the process.

As has been described above, according to the second embodiment, the E-mail message M0 is sent to the recipient mobile phone 2 only in the case where the recipient mobile phone 2 is at the reception location specified by the reception location information R0. Therefore, the recipient using the recipient mobile phone 2 can receive the E-mail message M0 in the reception location and at the reception time specified by the sender using the sender mobile phone 1.

The GPS means 23 of the recipient mobile phone 2 is preferably driven at predetermined intervals. In this manner, power consumption by the recipient mobile phone 2 can be less than in the case of always activating the GPS means 23.

In the second embodiment, the reception location information R0 is sent from the mail server 3 to the recipient mobile phone 2 in advance. However, the reception location information R0 maybe sent to the recipient mobile phone 2 together with the E-mail message M0. In this case, the recipient mobile phone 2 does not display the E-mail message M0 on the liquid crystal display 22 immediately after the reception. The recipient mobile phone 2 displays the E-mail message M0 in the case where the recipient mobile phone 2 is moved to the reception location. The E-mail message M0 is displayed on the liquid crystal display monitor 22 with a sound for notifying the reception, as if the E-mail message M0 had just been received.

In the first and second embodiments described above, the E-mail message M0 sent from the sender mobile phone 1 is received by the recipient mobile phone 2. However, the E-mail message M0 may be sent from various types of terminals, such as a personal computer and a PDA.

What is claimed is:

1. An E-mail sending method for sending an E-mail message from a sender terminal to a recipient mobile terminal as a destination of the E-mail message, the method comprising the steps of:
   storing the E-mail message sent with a reception location being specified by the sender terminal;
   making a judgment as to whether or not the recipient mobile terminal particularly specified in the E-mail message is at the reception location;
   sending the E-mail message to the recipient mobile terminal in the case where a result of the judgment is affirmative,
   wherein, in the case where the E-mail message sent from the sender terminal designates reception time,
   the step of making a judgment is the step of making a judgment as to whether or not the reception time has come, in addition to the judgment as to whether or not the recipient mobile terminal is at the reception location, and wherein
   the step of sending the E-mail message is the step of sending the E-mail message to the recipient mobile terminal in the case where a result of the judgment as to whether or not the reception time has come becomes affirmative and the result of the judgment as to whether or not the recipient mobile terminal is at the reception location is also affirmative,
   sending the E-mail message to the recipient mobile terminal in the case where the result of the judgment as to whether or not the recipient mobile terminal is at the reception location is negative after a predetermined time has elapsed since starting of the judgment as to whether or not the reception time has come; and
   sending an E-mail message to the sender terminal for notifying that the E-mail message has been sent.

2. An E-mail sending method for sending an E-mail message from a sender terminal to a recipient mobile terminal as a destination of the E-mail message, the method comprising the steps of:
   storing the E-mail message sent with a reception location being specified by the sender terminal;
   making a judgment as to whether or not the recipient mobile terminal particularly specified in the E-mail message is at the reception location;
   sending the E-mail message to the recipient mobile terminal in the case where a result of the judgment is affirmative;
   sending the E-mail message to the recipient mobile terminal in the case where the result of the judgment as to whether or not the recipient mobile terminal is at the reception location is negative after a predetermined time has elapsed since transmission of the E-mail message by the sender terminal; and
   sending an E-mail message to the sender terminal for notifying that the E-mail message has been sent.

3. An E-mail sending apparatus for sending an E-mail message sent from a sender terminal to a recipient mobile terminal as a destination of the E-mail message, the apparatus comprising:
   mail storage means for storing the E-mail message sent with a reception location being specified by the sender terminal;
   position judgment means for making a judgment as to whether or not the recipient mobile terminal particularly specified in the E-mail message is at the reception location; and
   transmission control means for sending the E-mail message to the recipient mobile terminal only in the case where a result of the judgment is affirmative,
   wherein, in the case where the E-mail message sent from the sender terminal designates reception time, the transmission control means makes a judgment as to whether or not the reception time has come in addition to the judgment as to whether or not the recipient mobile terminal is at the reception location, and
   the transmission control means sends the E-mail message to the recipient mobile terminal in the case where a result of the judgment about the reception time becomes affirmative and the result of the judgment as to whether or not the recipient mobile terminal is at the reception location is also affirmative,
   wherein the transmission control means sends the E-mail message to the recipient mobile terminal in the case where the result of the judgment as to whether or not the recipient mobile terminal is at the reception location is negative after a predetermined time has elapsed since starting of the judgment as to whether or not the reception time has come,
   wherein the transmission control means sends an E-mail message to notify the sender terminal that the E-mail message has been sent.

4. An E-mail sending apparatus for sending an E-mail message sent from a sender terminal to a recipient mobile terminal as a destination of the E-mail message, the apparatus comprising:
   mail storage means for storing the E-mail message sent with a reception location being specified by the sender terminal;
   position judgment means for making a judgment as to whether or not the recipient mobile terminal particularly specified in the E-mail message is at the reception location; and
   transmission control means for sending the E-mail message to the recipient mobile terminal only in the case where a result of the judgment is affirmative,
   wherein the transmission control means sends the E-mail message to the recipient mobile terminal in the case where the result of the judgment as to whether or not the recipient mobile terminal is at the reception location is negative after a predetermined time has elapsed since the sender terminal sent the E-mail message,
   wherein the transmission control means sends an E-mail message to notify the sender terminal that the E-mail message has been sent.

5. A computer readable medium encoded with a program for causing a computer to execute an E-mail sending method for sending an E-mail message from a sender terminal to a recipient mobile terminal as a destination of the E-mail message, the program comprising the steps of:
   storing the E-mail message sent with a reception location being specified by the sender terminal;
   making a judgment as to whether or not the recipient mobile terminal particularly specified in the E-mail message is at the reception location; and
   sending the E-mail message to the recipient mobile terminal in the case where a result of the judgment is affirmative,
   wherein, in the case where the E-mail message sent from the sender terminal designates reception time, the step of making a judgment is the step of making a judgment as to whether or not the reception time has come, in addition to the judgment as to whether or not the recipient mobile terminal is at the reception location, and wherein the step of sending the E-mail message is the step of sending the E-mail message to the recipient mobile terminal in the case where a result of the judgment as to whether or not the reception time has come becomes affirmative and the result of the judgment as to whether or not the recipient mobile terminal is at the reception location is also affirmative;

sending the E-mail message to the recipient mobile terminal in the case where the result of the judgment as to whether or not the recipient mobile terminal is at the reception location is negative after a predetermined time has elapsed since starting of the judgment as to whether or not the reception time has come; and sending an E-mail message to the sender terminal for notifying that the E-mail message has been sent.

6. A computer readable medium encoded with a program for causing a computer to execute an E-mail sending method for sending an E-mail message from a sender terminal to a recipient mobile terminal as a destination of the E-mail message, the program comprising the steps of:

storing the E-mail message sent with a reception location being specified by the sender terminal;

making a judgment as to whether or not the recipient mobile terminal particularly specified in the E-mail message is at the reception location;

sending the E-mail message to the recipient mobile terminal in the case where a result of the judgment is affirmative;

sending the E-mail message to the recipient mobile terminal in the case where the result of the judgment as to whether or not the recipient mobile terminal is at the reception location is negative after a predetermined time has elapsed since transmission of the E-mail message by the sender terminal; and sending an E-mail message to the sender terminal for notifying that the E-mail message has been sent.

* * * * *